United States Patent
Corbesero

(10) Patent No.: US 9,239,775 B1
(45) Date of Patent: Jan. 19, 2016

(54) COORDINATED TESTING

(75) Inventor: Stephen Corbesero, Bethlehem, PA (US)

(73) Assignee: SYNCHRONOSS TECHNOLOGIES, INC., Bridgewater, NJ (US)

(*) Notice: Subject to any disclaimer, the term of this patent is extended or adjusted under 35 U.S.C. 154(b) by 222 days.

(21) Appl. No.: 13/549,290

(22) Filed: Jul. 13, 2012

Related U.S. Application Data

(60) Provisional application No. 61/662,213, filed on Jun. 20, 2012.

(51) Int. Cl.
*G06F 11/00* (2006.01)
*G06F 11/36* (2006.01)

(52) U.S. Cl.
CPC ........ *G06F 11/3668* (2013.01); *G06F 11/3676* (2013.01); *G06F 11/3684* (2013.01); *G06F 11/3692* (2013.01)

(58) Field of Classification Search
CPC ............ G06F 11/3688; G06F 11/3684; G06F 11/3692; G06F 11/3676; G06F 11/3696; G06F 11/34
USPC ....................................................... 714/38.1
See application file for complete search history.

(56) References Cited

U.S. PATENT DOCUMENTS

| | | | |
|---|---|---|---|
| 5,671,351 A * | 9/1997 | Wild et al. | 714/38.13 |
| 6,023,620 A | 2/2000 | Harisson | |
| 7,159,036 B2 | 1/2007 | Hinchliffe et al. | |
| 7,809,988 B1 * | 10/2010 | Portal et al. | 714/38.13 |
| 7,966,523 B2 * | 6/2011 | Weatherhead | 714/33 |
| 8,010,095 B2 | 8/2011 | Natsuno et al. | |
| 8,224,308 B1 | 7/2012 | Gavrylyako et al. | |
| 8,433,953 B1 * | 4/2013 | Gaudette et al. | 714/33 |
| 2003/0120463 A1 * | 6/2003 | Cox et al. | 702/186 |
| 2005/0193258 A1 * | 9/2005 | Sutton | 714/32 |
| 2006/0199599 A1 | 9/2006 | Gupta et al. | |
| 2008/0051071 A1 | 2/2008 | Vishwanathan et al. | |
| 2009/0300587 A1 * | 12/2009 | Zheng et al. | 717/127 |
| 2012/0204155 A1 * | 8/2012 | Ben-Artzi et al. | 717/125 |

* cited by examiner

*Primary Examiner* — Yolanda L Wilson
(74) *Attorney, Agent, or Firm* — Haverstock & Owens LLP

(57) ABSTRACT

A single file is used to coordinate multiple testing processes. The single file is used to start a test, for other aspects of testing, including, but not limited to, checking test prerequisites before the run, the collection of load driver logs, the analysis of collected test data, and the generation of database and other reports for the test run. The file is generated as a script to set variables and then launch one or more load driver instances on the local and/or network attached severs. The file is used by other programs and scripts as a "run description" data file to check or control the viability of the test before launch, the status of the test if the test is currently in progress, collect the results of the test after finishing, and to begin the analysis and report generation of the collected test results.

24 Claims, 3 Drawing Sheets

COORDINATED TESTING

CROSS-REFERENCE TO RELATED APPLICATION(S)

This application claims priority under 35 U.S.C. §119(e) of the U.S. Provisional Patent Application Ser. No. 61/662,213, filed Jun. 20, 2012 and titled, "COORDINATED TESTING" which is also hereby incorporated by reference in its entirety for all purposes.

FIELD OF THE INVENTION

The present invention relates to the field of product testing. More specifically, the present invention relates to performance and capacity testing.

BACKGROUND OF THE INVENTION

Performance testing is, in general, testing performed to determine how a system performs in terms of responsiveness and stability under a particular workload. Performance testing is able to be used to investigate, measure, validate or verify other quality attributes of a system, such as scalability, reliability and resource usage. Performance testing includes several types such as load testing, stress testing, endurance testing, spike testing, configuration testing and isolation testing.

SUMMARY OF THE INVENTION

A single file is used to coordinate multiple testing processes. The single file is used to start a test, for other aspects of testing, including, but not limited to, checking test prerequisites before the run, the collection of load driver logs, the analysis of collected test data, and the generation of a database and other reports for the test run.

The file is generated as a script (e.g., a shell script) to set variables (e.g., shell variables) and then launch one or more load driver instances on local and/or network attached severs. The file is used by other programs and scripts as a "run description" data file to check or control the viability of the test before launch, the status of the test if the test is currently in progress, collect the results of the test after finishing, and to begin the analysis and report generation of the collected test results.

By using a single run description file in the multiple phases of test execution, the chance of errors is greatly reduced. For example, using the run description prior to the tests, it is highly likely that the test will successfully start because the load driver environment has the necessary properties including pre-loaded test data and test-flow specific settings.

DETAILED DESCRIPTION OF THE PREFERRED EMBODIMENT

Figure 1:
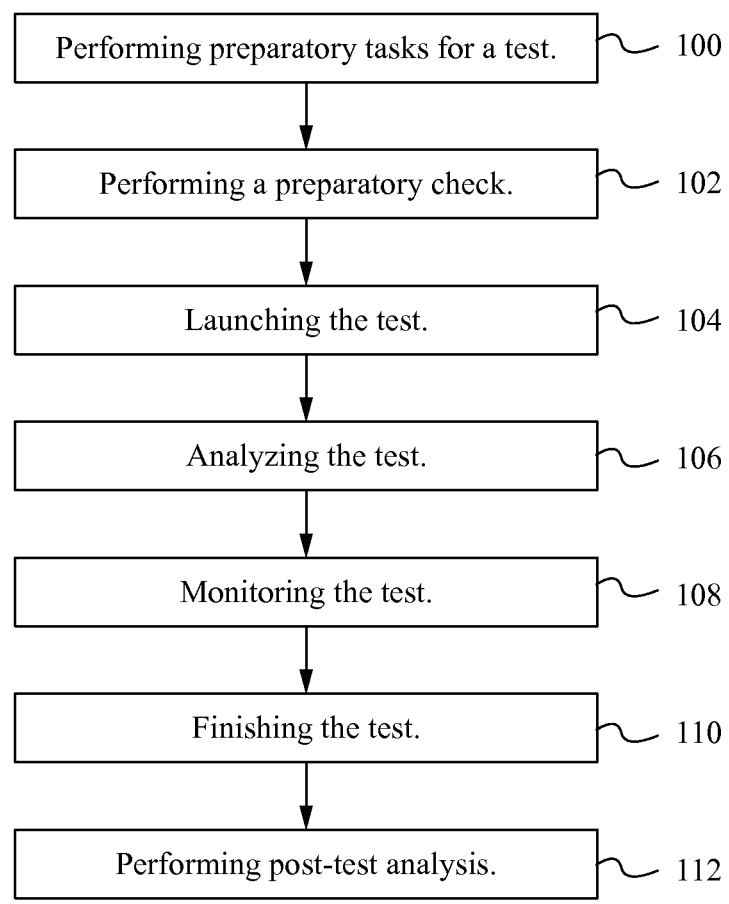
FIG. 1 illustrates a flowchart of a method of coordinated testing according to some embodiments.

To improve the quality of performance and capacity testing, a single file is used to coordinate multiple testing processes. The single file is used to start a test, during testing and during analysis of the testing afterwards. For example, the single file is able to be used in many parts of testing, including, but not limited to, checking test prerequisites before the run, the collection of load driver logs, the analysis of collected test data, and the generation of database and other reports for the test run. In some embodiments, the file is generated as a shell script to set shell variables and then launch one or more load driver instances on the local and/or network attached severs. The file is used by other programs and scripts as a "run description" data file (e.g., a file that is able to read to provide a description of the run-time operations) to check or control the viability of the test before launch, the status of the test if the test is currently in progress, collect the results of the test after finishing, and to begin the analysis and report generation of the collected test results.

As described above, the single file is used to coordinate different aspects of the test process, including but not limited to, ensuring that the correct load drivers are prepared and loaded with the proper test data before a test is performed. After a test is completed, the single file is used to retrieve data from the load drivers used. Additionally, the single file that was used to run the test is also able to inform the other testing tools what data to collect and where to store the collected data.

In some embodiments, scripts such as shell scripts are used to implement the coordinated testing. In some embodiments, the scripts are contained in the single file, and in some embodiments, the scripts are contained in multiple files. The main script is referred to as "run script" which is used to specify the testing flow, what happens on each one of the load drivers and what block of data each load driver is using as well as additional information.

To start a test a user runs the run script. Other scripts read the run script; the scripts read the run script as if it were data to be able to determine which load drivers are used in the test (e.g., watch certain load drivers during the test) and grab data from those load drivers. Before the test, the run script is able to be used to check that the correct configuration files are being used, the corrected data is mounted and other pre-test parameters. An exemplary coordinated test script setup includes a first shell script that launches a test and a second shell script watches the test while running and uses the first script to figure out what flows to monitor.

By using a single file, the user is able to verify and validate data for the test, start the test, check the test and watch the test, all from a single point, so that there is not a duplication of configuration information.

Furthermore, to validate several different features, the coordinated testing method is able to concurrently test the features, as opposed to testing the features separately as was performed previously.

In some embodiments, a script (e.g. the run script) is able to control the test while the test is running. For example, the script is able to control different aspects of the test to initiate, pause, stop or modify the test in any manner. To supervise the test, the script is configured in a way that allows the script to interact with the test. For example, the script is configured to send the appropriate data to the appropriate addresses of varying devices.

The coordinated testing is able to monitor many aspects of a test including, but not limited to, how long a test runs and does the test have enough blocks of data to run. The coordinated testing is also able to prepare a block of data for testing, for example, in the run script the preparation steps are described for a given flow, so that the script performs the preparation work automatically.

In some embodiments, the coordinated testing is integrated with the design process of programming development. For example, use cases are integrated with a test scheme, so that several stages of testing are coordinated.

FIG. 1 illustrates a flowchart of a method of coordinated testing according to some embodiments. In the step 100, a script performs preparatory tasks for a test (e.g. determines if new data blocks need to be loaded, and if so, load the data blocks including generating new configuration files). In the step 102, a verification script performs a preparatory check. For example, the verification script analyzes a run script to inform a user what will happen in the test and checks that the correct data and configuration files are on the load drivers, which is done on a per load driver basis. The verification script also performs higher level checks (e.g., ensure the load drivers are all running for a same amount of time, ensure the blocks are not shorter than needed and other checks). When the script determines the preparation is completed and the test is ready to run, the test is launched, in the step 104. In some embodiments, the script launches the test, and in some embodiments, the test is launched independently of the script. In some embodiments, additional steps are taken between the verification step and the launch step. In the step 106, the run script analyzes the test. For example, the run script indicates the steps of the test as they start. The run script also enables specific feature analysis. In the step 108, the run script or a separate monitoring script monitors the test. For example, the monitoring script monitors the load drivers and indicates what the load drivers are doing (e.g., tasks sent, errors found and more) to enable a user to determine if something is going wrong. In some embodiments, an additional monitoring tool is concurrently used with the monitoring script. In the step 110, the test finishes. In the step 112, post-test analysis is performed. For example, the run script or one or more additional scripts are run to collect data and integrate the data with one or more reports. In some embodiments, more or fewer steps are implemented. For example, the software to be tested is installed before running the script. In another example, the run script or other scripts are modified specifically for the test. In yet another example, if a test fails, then post test analysis is not performed. Additionally, the timing of the steps is able to be such that the steps occur within seconds (or less), minutes, hours or days of each other. In some embodiments, the order of the steps is modified. Any of the steps described herein are able to be performed automatically or manually.

Figure 2:
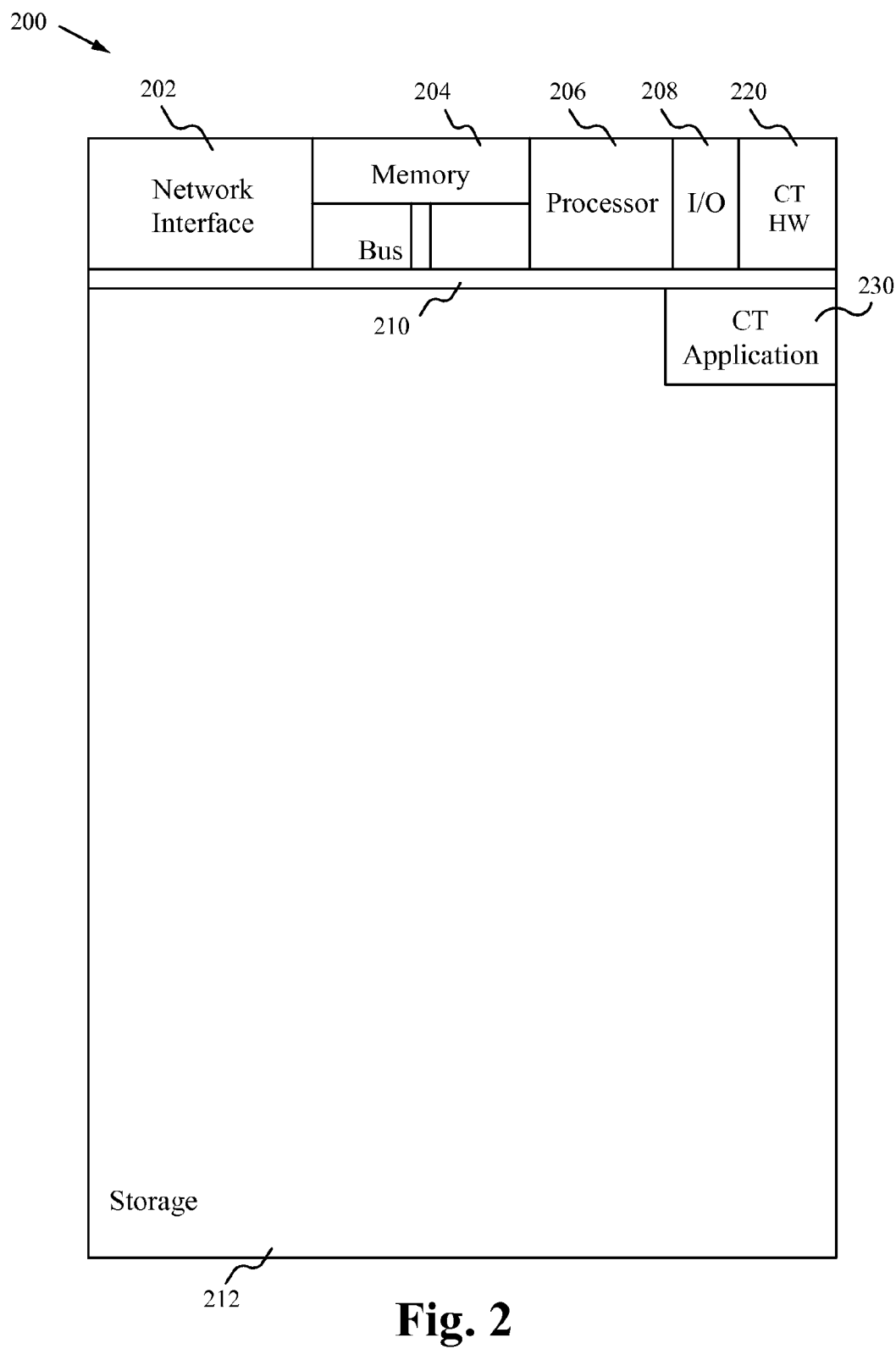
FIG. 2 illustrates a block diagram of an exemplary computing device configured to implement the coordinated testing method according to some embodiments.

FIG. 2 illustrates a block diagram of an exemplary computing device configured to implement the coordinated testing method according to some embodiments. The computing device 200 is able to be used to acquire, store, compute, process, communicate and/or display information. For example, a computing device 200 is able to be used for load testing. In general, a hardware structure suitable for implementing the computing device 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, Blu-Ray®, flash memory card or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. In some embodiments, the hardware structure includes multiple processors and other hardware to perform parallel processing. Coordinated testing application(s) 230 used to perform coordinated testing method are likely to be stored in the storage device 212 and memory 204 and processed as applications are typically processed. More or fewer components shown in FIG. 2 are able to be included in the computing device 200. In some embodiments, coordinated testing hardware 220 is included. Although the computing device 200 in FIG. 2 includes applications 230 and hardware 220 for implementing the coordinated testing method, the coordinated testing method is able to be implemented on a computing device in hardware, firmware, software or any combination thereof. For example, in some embodiments, the coordinated testing applications 230 are programmed in a memory and executed using a processor. In another example, in some embodiments, the coordinated testing hardware 220 is programmed hardware logic including gates specifically designed to implement the method.

In some embodiments, the coordinated testing application(s) 230 include several applications and/or modules. In some embodiments, modules include one or more sub-modules as well.

Examples of suitable computing devices include a personal computer, a laptop computer, a computer workstation, a server, a mainframe computer, a handheld computer, a personal digital assistant, a cellular/mobile telephone (e.g. an iPhone®), a smart appliance, a tablet computer (e.g. an iPad®) or any other suitable computing device.

Figure 3:
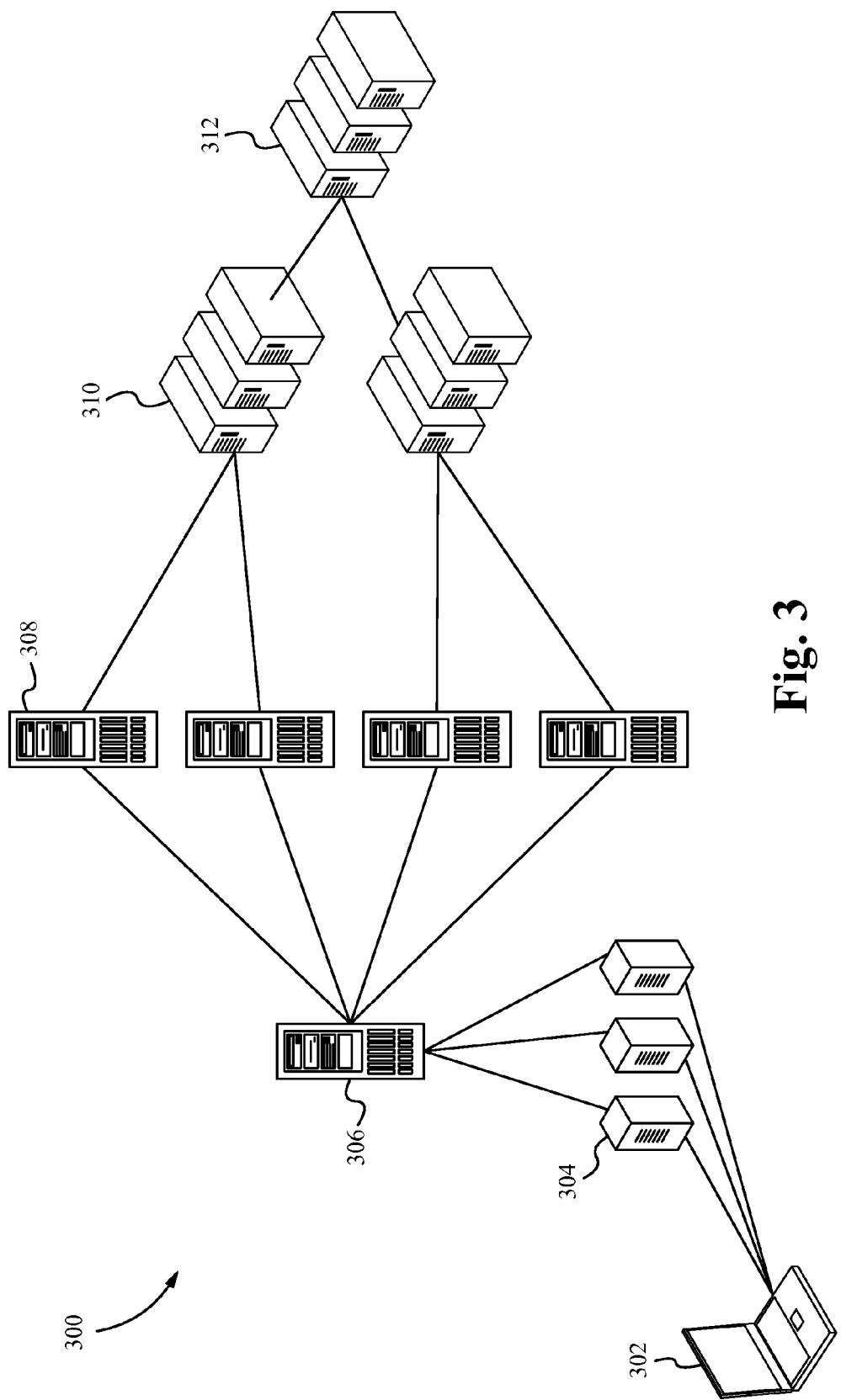
FIG. 3 illustrates a diagram of an exemplary performance test setup to implement the coordinated testing according to some embodiments.

FIG. 3 illustrates a diagram of an exemplary performance test setup to implement the coordinated testing according to some embodiments. The exemplary test setup 300 includes a controller 302, load generators 304, a load balancer 306, web servers 308, application servers 310 and a database servers 312. The controller 302 launches the load test. The controller 302 also runs the run script as described herein, for example, the run script analyzes and monitors the load drivers. Additional scripts are run on the controller 302 or other devices depending on the implementation of the script. The load generators 304 simulate loads such as users accessing a website. The load balancer 306 distributes the load to the web servers 308. The web servers 308 perform web serving duties which involves accessing data from the application servers 310. The application servers 310 serve the applications which access data from the database server 312. Other processes and tasks are performed by the respective devices as desired or needed. In some embodiments, fewer or additional devices are utilized.

To utilize the coordinated testing method, a user runs a single script or multiple scripts which are able to analyze test conditions, including pre-test, test and post-test conditions. By using the coordinated testing method, the user is able to prepare a test procedure and detect errors more effectively.

In operation, coordinated testing helps to prevent a test malfunctioning mid-test due to a improper test configuration or other errors. By using a single run description file in the multiple phases of test execution, the chance of errors is greatly reduced.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of implementing coordinated testing programmed in a memory of a device comprising:
   a. checking pre-test values before initiating a test;
   b. initiating the test with a single run script including launching one or more load drivers on one or more network attached servers;
   c. monitoring test values with a monitoring script during the test, wherein monitoring includes retrieving data from the one or more load drivers; and
   d. analyzing test results from the test, wherein checking, initiating, monitoring and analyzing are performed in cooperation with the single run script, wherein the monitoring script reads the single run script as if the run script were a data file in order to determine which of the one or more load drivers to monitor and from which of the one or more load drivers to retrieve the data.

2. The method of claim 1 wherein checking pre-test values comprises checking pre-loaded test data and test-flow specific settings.

3. The method of claim 1 wherein checking the pre-test values comprises checking for correct configuration files and mounted data.

4. The method of claim 1 wherein monitoring the test values includes monitoring a test run length, analyzing specific features being tested and monitoring load drivers.

5. The method of claim 1 wherein analyzing the test results comprises collecting load driver logs and analyzing the logs.

6. The method of claim 1 wherein analyzing the test results comprises generating a database and a report based on the test results.

7. The method of claim 1 wherein the single script is used by one or more additional scripts as a run description data file to specify a testing flow, load driver function information and load driver block information.

8. The method of claim 1 wherein the single script informs one or more additional tools what data to collect and where to store the collected data.

9. The method of claim 1 wherein the single script performs supervisory tasks including controlling aspects of the test.

10. The method of claim 1 wherein the test is integrated with a design process of program development.

11. The method of claim 1 further comprising collecting data and integrating the data in a report.

12. A method of implementing coordinated testing programmed in a memory of a device comprising:
   a. performing a pre-test analysis using a verification script;
   b. launching a test using a run script, wherein the test includes launching one or more load drivers on one or more network attached servers;
   c. monitoring the test using a monitoring script; and
   d. performing post-processing analysis using an analysis script, wherein the verification script, the monitoring script and the analysis script are each configured to read the run script as if the run script were a data file in order to perform the performing, monitoring and analysis.

13. The method of claim 12 wherein the run script performs preparatory tasks for the test.

14. The method of claim 12 wherein the verification script uses the run script to inform a user of a test process and checks that correct data and configuration files are on load drivers.

15. The method of claim 12 wherein the run script further indicates steps of a test as each step starts.

16. The method of claim 12 wherein the monitoring script monitors load drivers and indicates what the load drivers are doing during the test.

17. The method of claim 12 wherein the analysis script collects data and integrates the data in a report.

18. The method of claim 12 wherein the run script performs supervisory tasks including controlling aspects of the test.

19. The method of claim 12 wherein the test is integrated with a design process of program development.

20. An apparatus comprising:
   a. a non-transitory memory for storing an application, the application for automatically:
      i. performing preparatory tasks for a test using a run script including loading data blocks and generating configuration files;
      ii. performing a preparatory check of test parameters using a verification script including checking that the data blocks and the configuration files are correct;
      iii. launching the test using the run script;
      iv. analyzing the test using the run script including indicating steps of the test as the steps start;
      v. monitoring the test using a monitoring script including monitoring load drivers and indicating what the load drivers are doing; and
      vi. performing post-test analysis using an analysis script including collecting test results and integrating the test results in a report, wherein the verification script, the monitoring script and the analysis script are each configured to read the run script as if the run script were a data file in order to provide a description of run-time operations to check viability of the test before launch, check the status of the test if the test is currently in progress, collect the test results of the test, and begin analysis and report generation of the collected test results; and
   b. a processing component coupled to the memory, the processing component configured for processing the application.

21. The apparatus of claim 20 wherein the verification script uses the run script to inform a user of a test process.

22. The apparatus of claim 20 wherein the verification script, the monitoring script and the analysis script utilize the run script as a run description data file.

23. The apparatus of claim 20 wherein the run script performs supervisory tasks including controlling aspects of the test.

24. The apparatus of claim 20 wherein the test is integrated with a design process of program development.

* * * * *